United States Patent
Teyeb et al.

(10) Patent No.: US 9,344,943 B2
(45) Date of Patent: May 17, 2016

(54) INTER-FREQUENCY AND INTER-RAT SMALL CELL DETECTION IN HETEROGENEOUS NETWORKS

(71) Applicant: Telefonaktiebolaget L M Ericsson (publ), Stockholm (SE)

(72) Inventors: Oumer Teyeb, Stockholm (SE); Mats Folke, Luleå (SE); Gunnar Mildh, Sollentuna (SE); Stefan Wager, Espoo (FI); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 171 days.

(21) Appl. No.: 13/818,145

(22) PCT Filed: Oct. 19, 2012

(86) PCT No.: PCT/SE2012/051123
§ 371 (c)(1),
(2) Date: Feb. 21, 2013

(87) PCT Pub. No.: WO2013/115696
PCT Pub. Date: Aug. 8, 2013

(65) Prior Publication Data
US 2014/0112310 A1 Apr. 24, 2014

Related U.S. Application Data

(60) Provisional application No. 61/592,255, filed on Jan. 30, 2012.

(51) Int. Cl.
*H04W 36/30* (2009.01)
*H04W 36/00* (2009.01)
(Continued)

(52) U.S. Cl.
CPC ............. *H04W 36/30* (2013.01); *H04W 24/10* (2013.01); *H04W 36/0094* (2013.01); *H04W 36/04* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2011/0038323 A1* | 2/2011 | Liang et al. | 370/329 |
| 2011/0128862 A1* | 6/2011 | Kallin et al. | 370/245 |
| 2012/0100884 A1* | 4/2012 | Radulescu et al. | 455/524 |

FOREIGN PATENT DOCUMENTS

WO 2013028128 A1 2/2013

OTHER PUBLICATIONS

3rd Generation Partnership Project. "Small cell discovery in HetNet." 3GPP TSG RAN WG2 #75, R2-114142, Aug. 22-26, 2011, pp. 1-2, Athens, Greece.
(Continued)

*Primary Examiner* — Hassan Kizou
*Assistant Examiner* — Hashim Bhatti
(74) *Attorney, Agent, or Firm* — Murphy, Bilak & Homiller, PLLC (57) ABSTRACT

Methods and apparatus for adapting thresholds for measurement triggering and measurement report triggering are disclosed. An example method, suitable for implementation in a base station, begins with monitoring (510, 610) a cell load for the cell served by the base station. The method continues with the determining (520, 630) of a first signal threshold for the serving cell to be used for triggering neighbor cell measurements by at least a first mobile terminal, or a second signal threshold for the serving cell to be used for triggering reporting of neighbor cell measurements by the first mobile terminal, or both, where said determining is based on the monitored cell load. The determined first signal threshold or the determined second signal threshold, or both, are transmitted (530, 640) to the first mobile terminal.

21 Claims, 7 Drawing Sheets

(51) Int. Cl.
*H04W 24/10* (2009.01)
*H04W 36/04* (2009.01)
*H04W 84/04* (2009.01)

(56) References Cited

OTHER PUBLICATIONS

3rd Generation Partnership Project. 3GPP TR 36.839 V0.4.0 (Nov. 2011). 3rd Generation Partnership Project; Technical Specification Group Radio Access Network; Evolved Universal Terrestrial Radio Access (E-UTRA); Mobility Enhancements in Heterogeneous Networks (Release 11 ). Nov. 2011.

3rd Generation Partnership Project. 3GPP TS 36.300 V11.0.0 (Dec. 2011). 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11). Dec. 2011.

3rd Generation Partnership Project. 3GPP TS 36.331 V1 0.4.0 (Dec. 2011). Release 10. Dec. 2011.

3rd Generation Partnership Project. "Small Cell Discovery for Traffic Offloading." 3GPP TSG RAN WG2 #75, R2-114009, Aug. 22-26, 2011, Athens Greece.

3rd Generation Partnership Project. 3GPP TSG RAN WG2 #76, R2-115821, Nov. 14-18, 2011, San Francisco, USA.

3rd Generation Partnership Project. "Detection of Small Cells in HetNets." 3GPP TSG-RAN WG2 meeting #77, R2-120467, Feb. 6-10, 2012, Dresden, Germany.

* cited by examiner

INTER-FREQUENCY AND INTER-RAT SMALL CELL DETECTION IN HETEROGENEOUS NETWORKS

RELATED APPLICATIONS

This application claims the benefit of and priority to U.S. Provisional Application Ser. No. 61/592,255, filed 30 Jan. 2012. The entire contents of said U.S. Provisional Application are incorporated herein by reference

BACKGROUND

There have been several proposals to meet the ever increasing traffic demands and high quality expectations for mobile broadband services. Some of the most widely adopted means to meet these demands include an upgrading of existing base stations to use higher data rate technologies such as High Speed Packet Access (HSPA) or Long Term Evolution (LTE), or to use other optimizations such as Multiple Input Multiple Output (MIMO), antenna tilting, etc. Mobile broadband systems can be further enhanced by a straightforward increase in the number of base stations in a given network, a technique known as macro densification. However, these methods of improving the data rate can provide system gains only to a certain extent, and they can end up being very expensive.

As a result, the concept of "heterogeneous networks," where the existing homogeneous network is overlaid with additional lower-power, low-complexity base stations, is currently being developed by members of the $3^{rd}$-Generation Partnership Project (3GPP) as a solution to mitigate the cost and/or capacity limitations of macro densification and base station upgrades.

The homogeneous layer of macro cells is known as a "macro" layer, as the base stations in this layer (known as eNBs, in 3GPP documentation for LTE) have large coverage areas. A non-homogenous layer overlaying the macro layer may contain several lower power nodes of any of several types. Some of these nodes are commonly referred to as "pico nodes" or "picos," and are low power base stations for indoor or outdoor usage, e.g., for "hot spot" coverage in high-traffic areas. Other nodes, typically transmitting with even lower power, are often referred to as "femto nodes" or simply "femtos." These are often used as home base stations (HeNBs), and are usually for indoor usage, such as in a private residence or small shop. Femtos that are open to only a few users (within a household, a shop, etc.) are termed within 3GPP as utilizing a Closed Subscriber Group (CSG).

Heterogeneous networks are expected to offer a low cost alternative to macro densification and will likely be more effective, since the deployment of the low power nodes can focus on traffic hot spots and areas with coverage problems. Note that the term "small cell" is used to refer to a pico or a femto cell for the rest of this document. Also, references to an eNB in the discussion that follows should be understood to refer to a macro eNB supporting a macro cell, unless the eNB is specifically referred to as a low-powered eNB supporting a small cell.

Handover is an important aspect of mobile communication systems, wherein the system tries to assure service continuity of a mobile terminal, known as "User Equipment" or "UE" in 3GPP documentation, by transferring the connection from one cell to another depending on several factors such as signal strength, load conditions, service requirements, etc. The provision of efficient/effective handovers, e.g., involving a minimum number of unnecessary handovers, a minimum number of handover failures, minimum handover delays, etc., affects not only the Quality of Service (QoS) of the end user but also the overall mobile network capacity and performance.

In LTE systems, UE-assisted, network controlled handover is utilized (see 3GPP TS 36.300, available at www.3gpp.org). The network configures the UE to perform measurements and send measurement reports when certain criteria are met. Based on these reports the UE is moved, if required and possible, to the most appropriate cell that will assure service continuity and quality. A UE measurement report configuration consists of the reporting criteria (whether it is periodic or event triggered) as well as the measurement information that the UE has to report.

In LTE, the most important measurement metrics used are the Reference Signal Received Power (RSRP) and Reference Signal Received Quality (RSRQ). RSRP is a cell specific measure of signal strength and it is mainly used for ranking different cells for handover and cell reselection purposes, and it is calculated as the linear average of the power of the Resource Elements (REs) which carry cell-specific Reference Symbols (RSs). The RSRQ, on the other hand, also takes the interference into consideration by taking the total received wideband power into account as well.

One of the measurement configuration parameters that UEs receive from their serving eNBs is the "s-Measure," which tells the UE when to start measuring neighboring cells. The s-Measure is defined as a Reference Signal Received Power (RSRP) value. Once a UE's measurement of the RSRP of its serving cell drops below the s-Measure threshold, the UE begins measuring the RSRP of neighboring cells, and the measured neighboring cells may ultimately be used for cell re-selection through handover. The s-Measure is an optional parameter, per the 3GPP specifications, and different s-Measure values can be specified for initiating intra-frequency, inter-frequency and inter-RAT measurements.

In homogenous networks, the use of the s-Measure as described above works quite well, because cells are usually deployed in such a way that they have small shared coverage areas around their cell edges. When a UE is very close to the eNB, the RSRP is typically higher than the s-Measure, and when the UE moves towards the cell edge, the RSRP decreases. At some point it falls below the s-Measure and the UE starts measuring the Reference Signal (RS) from neighboring cells. Thus, the UE starts measuring RS from other cells only when it is necessary to do so.

In heterogeneous networks, on the other hand, a straightforward usage of the s-Measure may cause problems, because small cells may be located close to the macro eNB (e.g., for capacity boosting in hotspots), so that the RSRP of the serving cell may be strong enough to not fall below the s-Measure threshold near the coverage area of the small cell, causing the UE not to measure the signal power of otherwise available small cells within its macro serving cell.

SUMMARY

Embodiments of the present invention are focused on optimizing inter-frequency and inter-RAT measurements in heterogeneous networks. This is achieved, in several embodiments, by using adaptive thresholds for measurement triggering and measurement report triggering. These triggering thresholds depend on the current load in the cell, or the load contribution from individual UEs, or a combination of both. These thresholds are also configurable on a per-UE basis. Thus, an eNB that needs some offloading can change the measurement configuration of some of the UEs served by the eNB, such as the ones that are contributing the most to the total load, so that these UEs can discover small cells. The eNB can then offload some or all of these UEs by handing them over to the small cells.

Several methods according to the inventive techniques described herein are suitable for implementation by a base station, such as an LTE eNB. In one example method, a base station (e.g., a macro eNB) monitors its total cell load, or the contribution of one or more individual mobile terminals (e.g., UEs) to the cell load. The base station then configures a selected set of one or more UEs with thresholds for measurement report triggering, where said thresholds are based on the total cell load, or the contribution of one or more individual mobile terminals to the cell load, or some combination of both. The base station then receives measurement reports from one or more of the selected set of one or more UEs, and enables inter-frequency/inter-RAT measurements as appropriate for those UEs.

More particularly, an example method described in detail below is suitable for implementation in a base station. This method, for adapting neighbor cell measurements performed by mobile terminals served by a serving cell supported by the base station, begins with monitoring a cell load for the serving cell. The method continues with the determining of a first signal threshold for the serving cell to be used for triggering neighbor cell measurements by at least a first mobile terminal, or a second signal threshold for the serving cell to be used for triggering reporting of neighbor cell measurements by the first mobile terminal, or both, wherein said determining is based on the monitored cell load. The determined first signal threshold or the determined second signal threshold, or both, are transmitted to the first mobile terminal.

In some embodiments, the monitored cell load is a total cell load for the serving cell. In some embodiments, the method includes a determining of individual cell load contributions for each of a group of two or more mobile terminals served by the serving cell. The first mobile terminal is then selected from the group of two or more mobile terminals, based on the individual cell load contributions. In some of these embodiments, the determining of the first signal threshold or second signal threshold, or both, is based on the individual cell load contribution for the first mobile terminal.

In some embodiments, the determining of the second signal threshold is based on the individual cell load contribution for the first mobile terminal, and the method further comprises receiving, from the first mobile terminal, a measurement report triggered by a comparison of a measurement to the second signal threshold. In response to this measurement report, the first mobile terminal is enabled to perform inter-frequency measurements or inter-radio-access-technology measurements, or both.

In any of the embodiments summarized above, the first serving cell signal threshold may be a threshold for triggering inter-frequency and inter-radio-access-technology measurements. Likewise, in any of the embodiments summarized above, one or both signal thresholds may correspond to Reference Signal Received Power (RSRP) measurements, or one or both signal thresholds may correspond to Reference Signal Received Quality (RSRQ) measurements.

Embodiments of the invention also include base station apparatus comprising processing circuits configured with appropriate software to carry out the method summarized above or variants thereof.

BRIEF DESCRIPTION OF THE DRAWINGS

Examples of embodiments herein are described in more detail with reference to attached drawings in which.

Of course, embodiments herein are not limited to the above features and advantages. Indeed, those skilled in the art will recognize additional features and advantages upon reading the following detailed description, and upon viewing the accompanying drawings.

DETAILED DESCRIPTION

Figure 1:
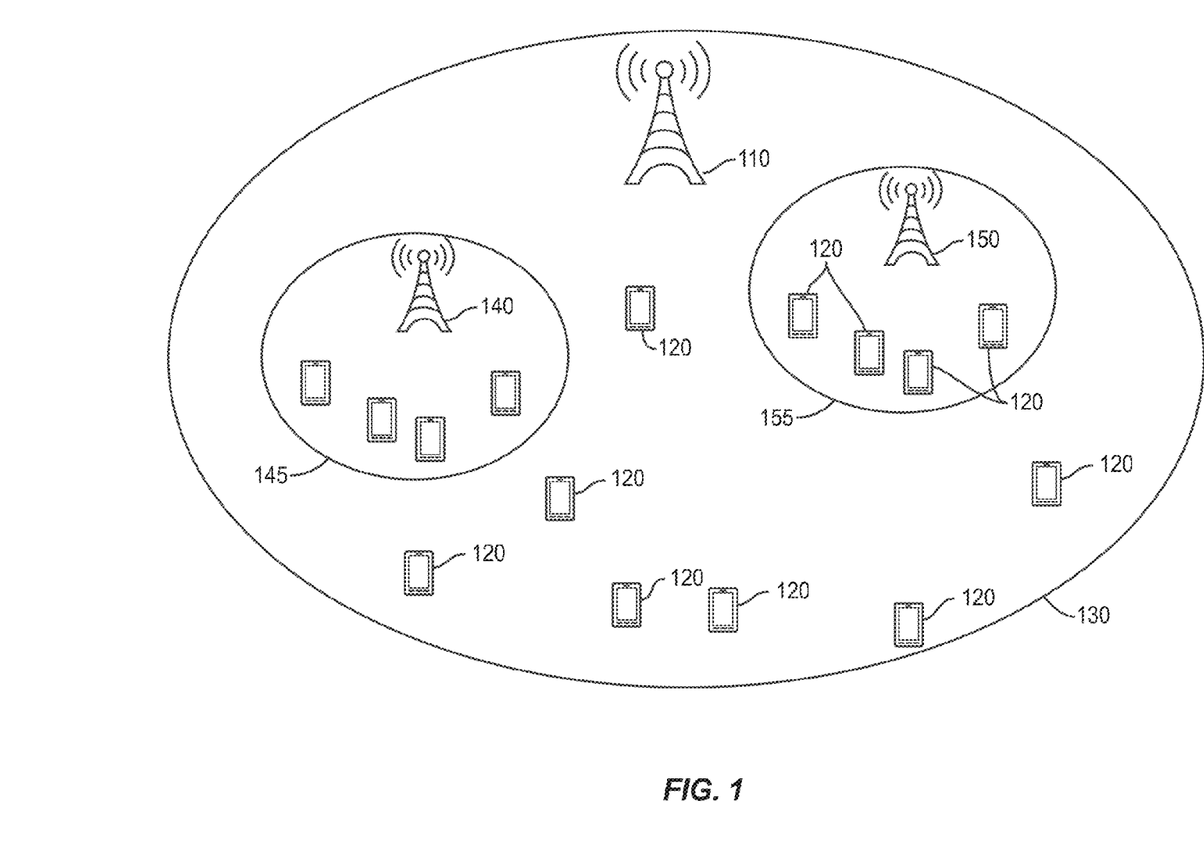
FIG. 1 is a block diagram of an example heterogeneous network.

FIG. 1 is a simplified network diagram illustrating a heterogeneous network deployment scenario. A homogeneous layer of conventional "macro" cells is known as a "macro layer," as the base stations in this layer may have large coverage areas, e.g., extending for several miles. In FIG. 1, base station 110 is a macro base station, providing service to multiple mobile terminals 120 via a macro cell that provides coverage over a macro coverage area 130. FIG. 1 also illustrates low power base stations 140 and 150, which provide service to mobile terminals 120 in coverage areas 145 and 155, respectively. These low power base stations may be either pico nodes or femto nodes.

For illustrative purposes, exemplary embodiments will be described below in the context of a Long-Term Evolution (LTE) system. Those skilled in the art will appreciate, however, that the concepts disclosed herein are generally applicable to other wireless communication systems. It should also be understood that the various alternatives described herein may also be combined, in some embodiments of the invention.

In the discussion that follows, the base station 110 is frequently described as an eNB, and the mobile terminals 120 are described as user equipment (UE). It should be understood that this use of 3GPP terminology is non-limiting and that other base stations and mobile terminals could be used. The techniques described herein may be applied to other types of communication systems, including systems other than those standardized by 3GPP. Likewise, mobile terminals 120 could correspond to any of various types of devices adapted for use in such systems, including cellular telephones, smartphones, PDAs, or laptop computers, for example.

As will be described below in greater detail, the base station 110 may adapt a triggering threshold, e.g., an s-Measure, for cell re-selection measurements by the mobile terminals 120 in the serving cell 130. When used herein, the expression "cell re-selection" is to be understood as including cell change through handover, i.e., cell change when performing handover. Further, the expression "cell re-selection measurements" is to be understood as comprising measurements for cell re-selection in IDLE mode and measurements in handover during CONNECTED mode. The cell re-selection measurements may be used by the base station 110 to perform a handover to transfer a session with one of the mobile terminals 120 to one of the low power base stations 140 or 150.

As noted above, in some wireless communication networks, such as LTE networks, UE-assisted, network controlled handover is utilized. This means that the network makes the actual decisions regarding whether a handover should be initiated, but does so based on information provided by the UE. As part of this process, the network configures the UE to perform measurements and to send measurement reports when certain criteria are met. The UE measurement report configuration sent to the UE comprises the reporting criteria, e.g., whether it the reports should be periodic or event triggered, as well as the measurement information that the UE must report. Based on the reports received at the base station from the UE, the UE is moved, if required and if possible, to the most appropriate cell that will provide service continuity and quality.

In LTE networks, two notable measurement metrics are the Reference Signal Received Power (RSRP) and Reference Signal Received Quality (RSRQ). RSRP is a cell-specific measure of signal strength and it is mainly used for ranking different cells for handover and cell reselection purposes, and it is calculated as the linear average of the power of the Resource Elements (REs) which carry cell-specific Reference Symbols (RSs). The RSRQ, on the other hand, also takes the interference into consideration by taking the total received wideband power into account as well.

One of the configuration parameters that UEs receive from the serving eNB is the parameter "s-Measure," which tells the UE when to start measuring neighboring cells. If the measured RSRP of the serving cell falls below the s-Measure, indicating that the signal of the UE's serving cell is not that strong anymore, the UE starts measuring the signal strength of RSs from the neighboring cells.

Figure 2:
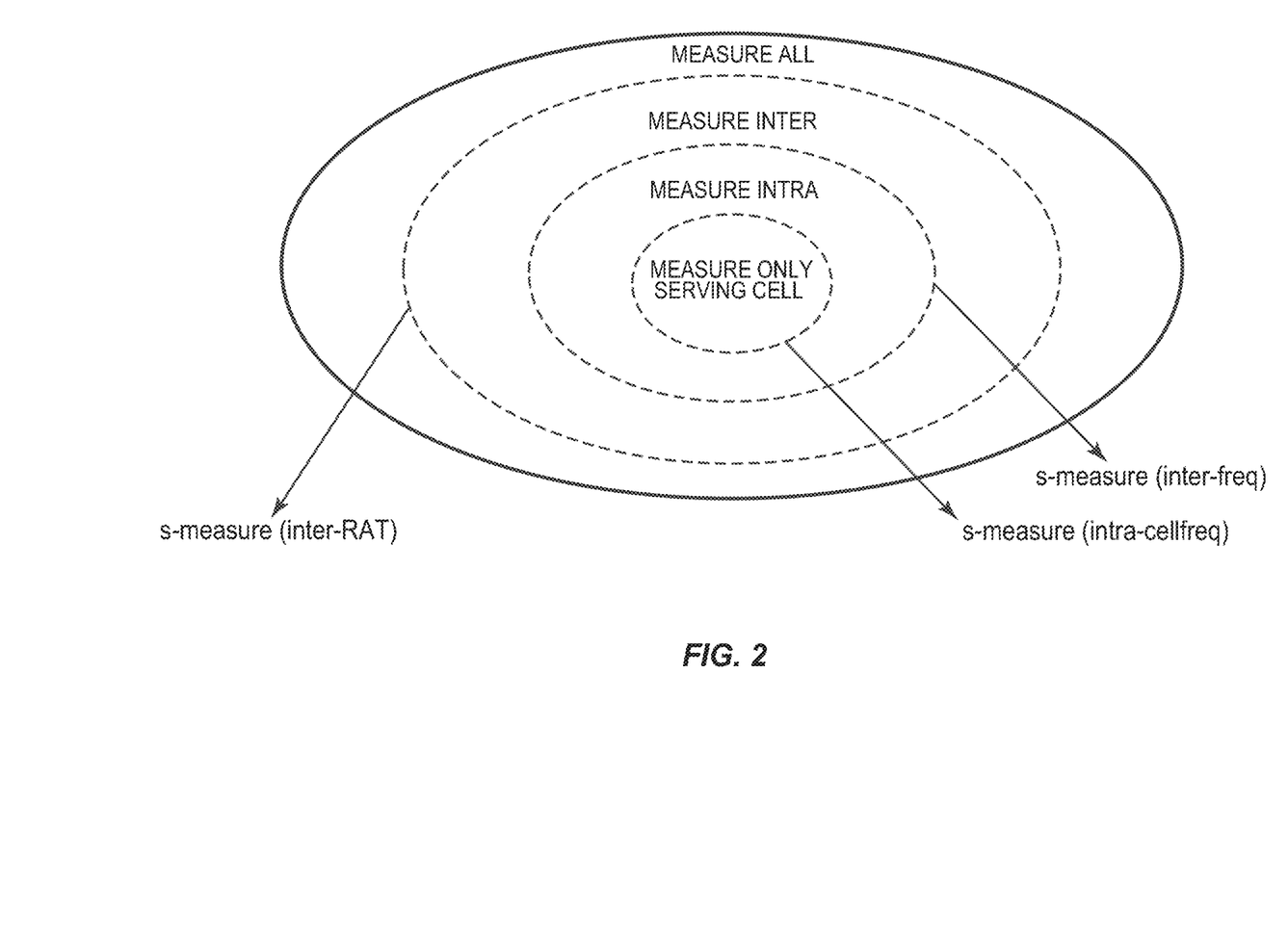
FIG. 2 illustrates several measurement regions in an example macro cell

An example illustrating the use of the s-Measure is illustrated in FIG. 2. As can be seen in the figure, by using appropriate s-Measure values, unnecessary neighbor cell measurements by the UEs can be avoided. For the scenario depicted in FIG. 2, a UE will not measure any neighbors when the UE is close to the cell center and experiences very good RSRP. The boundary of this center region is defined by a first s-Measure value, which controls when the UE begins to perform measurements on neighbor cells in the same operating frequency band (intra-frequency measurements). As UEs move farther and farther away from the cell center, the RSRP falls below this first s-Measure, triggering measurements on intra-frequency neighbors. The UE continues to make these measurements so long as it remains outside the center region.

Additional s-Measure values can be used to define boundaries beyond which the UE successively adds measurements for neighbor cells on different frequencies (inter-frequency measurements) and on different radio-access technologies (inter-RAT measurements). As seen in FIG. 2, these s-Measure values define additional regions, removed from the center of the cell, where the UE performs these additional measurements.

While the s-Measure determines when the UE starts measuring other cells, there are several other measurement configuration parameters that specify the triggering of handover measurement reports from the UE. The following event-triggered criteria are specified for intra-RAT measurement reporting in LTE and are discussed in greater detail in the 3GPP document "Radio Resource Control (RRC) Protocol," 3GPP TS 36.331 (available from www.3gpp.org):

Event A1: A signal metric for the serving cell becomes better than an absolute threshold (e.g., RSRP of the serving cell exceeds the absolute threshold).

Event A2: A signal metric for the serving cell becomes worse than an absolute threshold (e.g., RSRP of the serving cell falls below the absolute threshold).

Event A3: A signal metric for a neighbor cell becomes better than an offset relative to a signal metric for the serving cell.

Event A4: A signal metric for a neighbor cell becomes better than an absolute threshold.

Event A5: A signal metric for a serving cell becomes worse than one absolute threshold and a signal metric for a neighbor cell becomes better than another absolute threshold.

Figure 3:
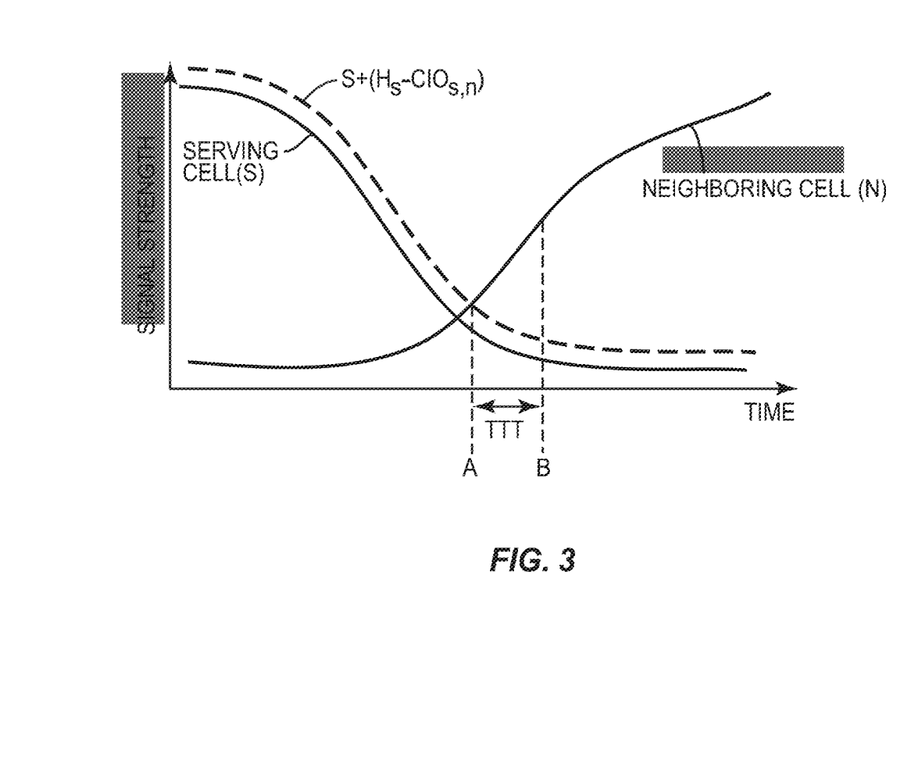
FIG. 3 is a signal strength diagram illustrating a handover event.

The most common measurement report triggering event related to handover is event A3. Its usage is illustrated in FIG. 3. The triggering conditions for event A3 may be formulated as:

$$N > S + HOM \quad (1)$$

where N and S are the signal strengths of the neighbor and serving cells, respectively, and HOM is the handover margin. HOM is the difference between the radio quality of the serving cell and the radio quality needed before attempting a handover. The radio quality is measured either using RSRP or RSRQ.

The UE triggers the intra-frequency handover procedure by sending an event A3 report to the eNB. This event occurs when the UE measures that the target cell is better than the serving cell, with a margin HOM, for at least a particular duration. HOM is calculated from the following configurable parameters, which are provided to the UE via Radio Resource Control (RRC) signaling when entering a cell:

$$HOM = Ofs + Ocs + Off - Ofn - Ocn + Hys \quad (2)$$

where:
Ofs is the frequency specific offset of the serving cell;
Ocs is the cell specific offset (CIO) of the serving cell;
Off is an offset specific to event A3, i.e., the a3-Offset;
Ofn is the frequency specific offset of the neighbor cell;
Ocn is the CIO of the neighbor cell; and
Hys is a hysteresis value.

If the condition defined in equations (1) and (2) is satisfied and remains valid for a certain duration known as Time-To-Trigger (TTT), the UE sends a measurement report to the serving eNB. In FIG. 3, event A3 is satisfied at point A and a measurement report is sent at point B in time). When the serving eNB gets the measurement report, it can initiate a handover towards the neighbour.

As mentioned above, currently the s-Measure is used to configure when the UE starts measuring neighbor cells, and the s-Measure is defined as an RSRP. In homogenous networks, this works out quite well because cells are usually deployed in such a way that they have small shared coverage areas around their cell edges. When a UE is very close to the eNB, the RSRP is typically higher than the s-Measure, and when the UE moves towards the cell edge, the RSRP decreases—at some point the RSRP falls below the s-Measure and the UE starts measuring the RS from neighboring cells. That is, the UE starts measuring RS from other cells only when it is necessary to do so.

The same settings might not work in a heterogeneous network, however. For instance, one or more small cells could be deployed very close to the macro eNB, e.g., for capacity boosting in hotspots. In such a scenario, the serving cell's RSRP may still be strong in areas where the small cell is available to provide service, so that relevant neighbor cell measurements might not be triggered on time. The result is that the UE fails to "discover" the small cell at the best time.

Figure 4:
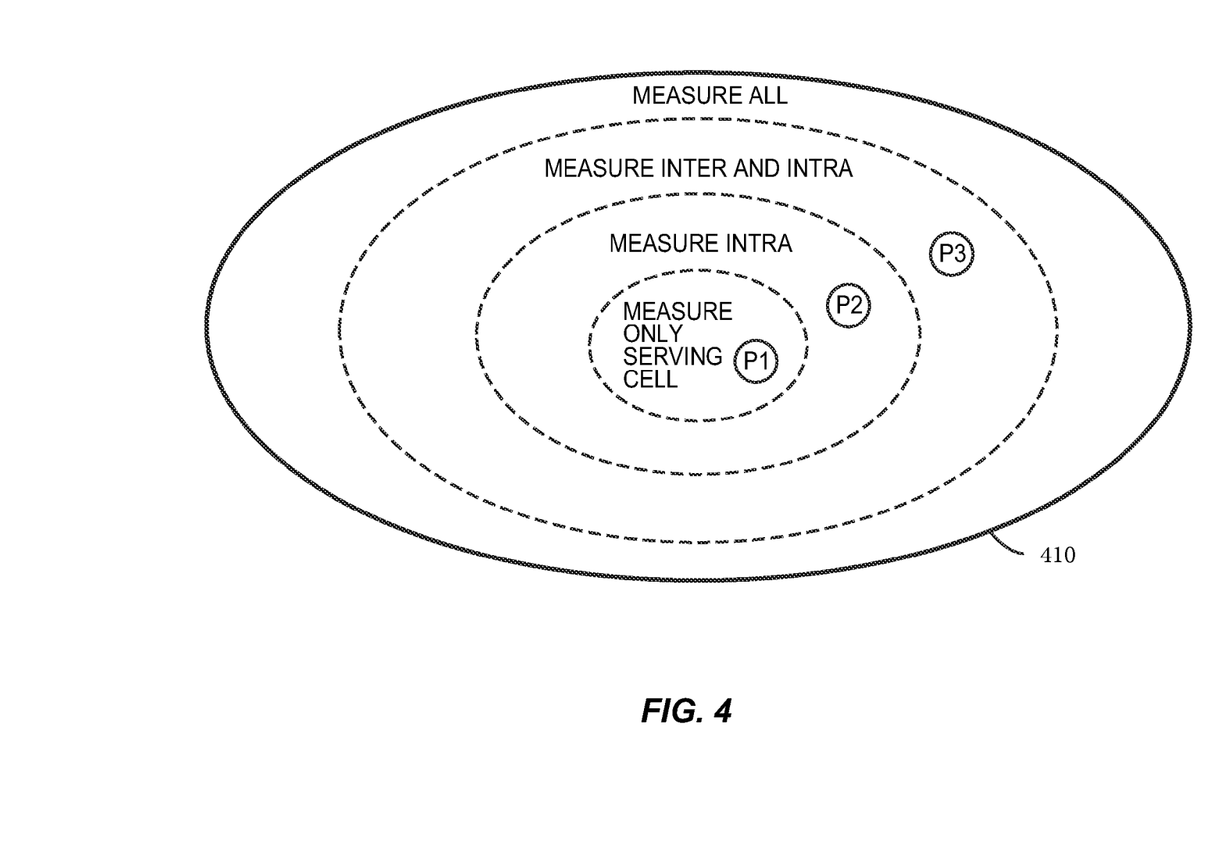
FIG. 4 illustrates an overlay of several small cells on the example macro cell of FIG. 2.

This scenario is illustrated in FIG. 4, where coverage areas for small cells P1, P2, and P3 are overlaid on the coverage area 410 of a macro cell. Given the same s-Measure settings as in FIG. 2, small cell P1 will never be discovered, whether it is an intra-frequency, inter-frequency, or inter-RAT neighbor, because its coverage area falls entirely within the region of the macro cell where no neighbor measurements are performed. Small cell P2 will be discovered only if it is an intra-frequency cell (i.e., using the same operating frequency band as the macro cell), since its coverage area falls within a region where only intra-frequency neighbor measurements are performed. Similarly, small cell P3 will not be discovered if it is an inter-RAT cell (i.e., using a radio access technology other than the macro cell), since its coverage area falls within a region where a UE will perform only inter-frequency and intra-frequency neighbor cell measurements.

Another drawback of using the s-Measure as described above is that once a given UE has been configured, the eNB has no way of knowing whether the UE is actually performing the measurements or not, unless measurement reports are actually sent. For example, to use the s-Measure for inter-frequency measurements, the UE must be enabled for such measurements, which may require the configuration of a measurement gap. Because the eNB is not aware of whether the UE is performing measurements, the eNB has to respect the measurement gap configuration and not schedule the UE during the gaps, even if the UE is experiencing a good RSRP value and not performing the actual measurements. While the UE can save some battery power by not performing inter-frequency measurement when the RSRP of the serving cell is higher than the s-Measure, it can still end up losing up to 15% in throughput because of the gaps (assuming pattern 0 that uses a 6 ms gap every 40 ms is employed).

One potential approach to address the issue of small cell discovery in heterogeneous networks is to use the RSRQ for the serving cell as a signal metric, instead of or along with the RSRP. Because RSRQ takes not only the signal strength of the serving cell but also interference from neighboring cells into account, a UE served by a macro cell and in the vicinity of a small cell will observe a low RSRQ for the macro cell, assuming intra-frequency operation for the small cell. However, there are two main drawbacks of this. First, this approach is not backward compatible. Thus, legacy UEs, which use an s-Measure based on RSRP, will not benefit. Second, this approach will not help in the case of inter-frequency and inter-RAT picos. For example, given the scenario in FIG. 4, it will only solve the issue regarding the discovery of P1, and then only if that small cell is using the same frequency as the macro.

Therefore, a backward compatible solution that can minimize the inter-frequency and inter-RAT measurements, without harming the small cell discovery likelihood, is required. Accordingly, in embodiments of the present invention the focus is placed on optimizing inter-frequency and inter-RAT measurements in heterogeneous networks. This is achieved, in several embodiments, by using adaptive thresholds for measurement triggering and measurement report triggering. These triggering thresholds depend on the current load in the cell, or the load contribution from individual UEs, or a combination of both. These thresholds are also configurable on a per-UE basis. Thus, an eNB that needs some offloading can change the measurement configuration of some of the UEs served by the eNB, such as the ones that are contributing the most to the total load, so that these UEs can discover small cells. The eNB can then offload some or all of these UEs by handing them over to the small cells.

Several methods according to the inventive techniques described herein are suitable for implementation by a base station, such as an LTE eNB. In one example method, detailed below, a base station (e.g., a macro eNB) monitors its total cell load, or the contribution of one or more individual mobile terminals (e.g., UEs) to the cell load. The base station then configures a selected set of one or more UEs with thresholds for measurement report triggering, where said thresholds are based on the total cell load, or the contribution of one or more individual mobile terminals to the cell load, or some combination of both. The base station then receives measurement reports from one or more of the selected set of one or more UEs, and enables inter-frequency/inter-RAT measurements as appropriate for those UEs.

These techniques are particularly applicable in heterogeneous networks. The proper configuration of inter-frequency and inter-RAT neighbor cell measurement in heterogeneous networks ensures that UEs will not waste their battery power for unnecessary measurements or be subjected to possible performance degradation, all while ensuring that the serving eNB is notified of offloading possibilities to small cells.

Figure 5:
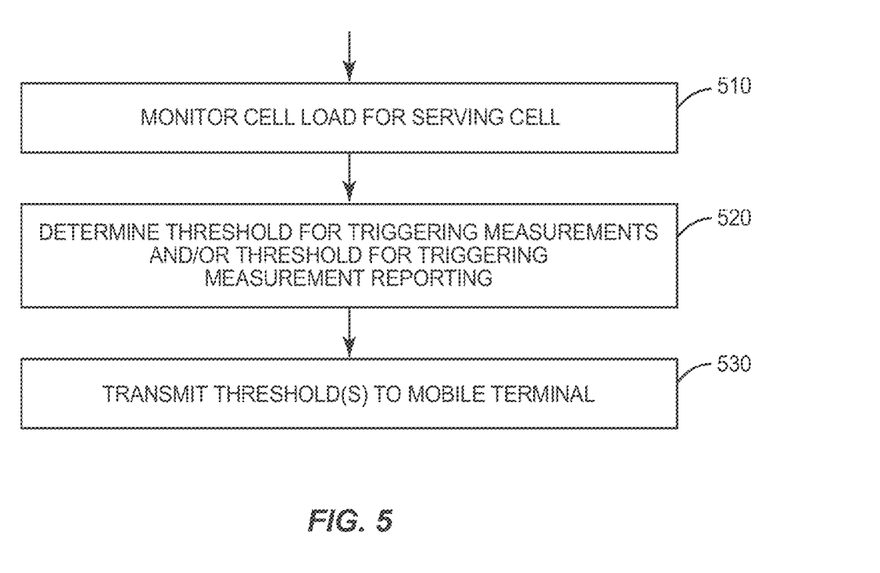
FIGS. 5 and 6 are logic flow diagrams of example embodiments of a method of adapting a triggering threshold for cell re-selection measurements.

The process flow diagram of FIG. 5 illustrates an example of these techniques for adapting neighbor cell measurements, as implemented by a base station serving one or more mobile terminals. As shown at block 510, the process begins with the base station (e.g., a macro eNB in a heterogeneous network) monitoring a cell load for the serving cell. The monitored cell load can be a total load for the serving cell, or individual cell load contributions for each of one or more mobile terminals, or some combination of both.

As shown at block 520, the base station determines one or more triggering thresholds to be used by a particular mobile terminal (or group of mobile terminals). The threshold or thresholds determined in this step are based on the monitored cell load and may include a first signal threshold for the serving cell, to be used for triggering neighbor cell measurements, or a second signal threshold for the serving cell to be used for triggering reporting of neighbor cell measurements, or both.

As shown at block 530, the base station then transmits the first signal threshold or the second signal threshold, or both, to the mobile terminal.

Thus, in the method illustrated in FIG. 5, a base station (e.g., a macro eNB) monitors its total cell load, or the contribution of one or more individual mobile terminals (e.g., UEs) to the cell load. The base station then configures a selected set of one or more UEs with thresholds for measurement report triggering, where said thresholds are based on the total cell load, or the contribution of one or more individual mobile terminals to the cell load, or some combination of both. The base station subsequently receives measurement reports from one or more of the selected set of one or more UEs, and can enable inter-frequency/inter-RAT measurements as appropriate for those UEs.

In some embodiments of the generalized method shown in FIG. 5, the eNB scales the s-Measure to be used for inter-frequency/inter-RAT measurements up or down, depending on the load that its cell is experiencing, before sending the scaled s-Measure to one or more UEs. This way, the UEs will be more likely to perform inter-frequency and inter-RAT measurements when the cell is highly loaded than when it is loaded. In other words, the likelihood that inter-frequency and inter-RAT measurements will be taken can be adapted to follow the offloading needs of the cell. The eNB can select all of the served UEs for this adaptation, or can randomly select a certain percentage of the UEs.

In some cases, the percentage of the UEs selected depends on the monitored cell load. In some embodiments, the UEs are selected on the basis of their individual cell load contributions. Accordingly, some embodiments of the method shown in FIG. 5 include determining individual cell load contributions for each of a group of two or more mobile terminals served by the serving cell and selecting at least one mobile terminal to be configured with the new threshold or thresholds, based on its individual cell load contribution. The values for the measurement triggering threshold and/or measurement report triggering threshold for a given UE may also be based on the individual cell load contribution for that UE, in some embodiments.

Figure 6:
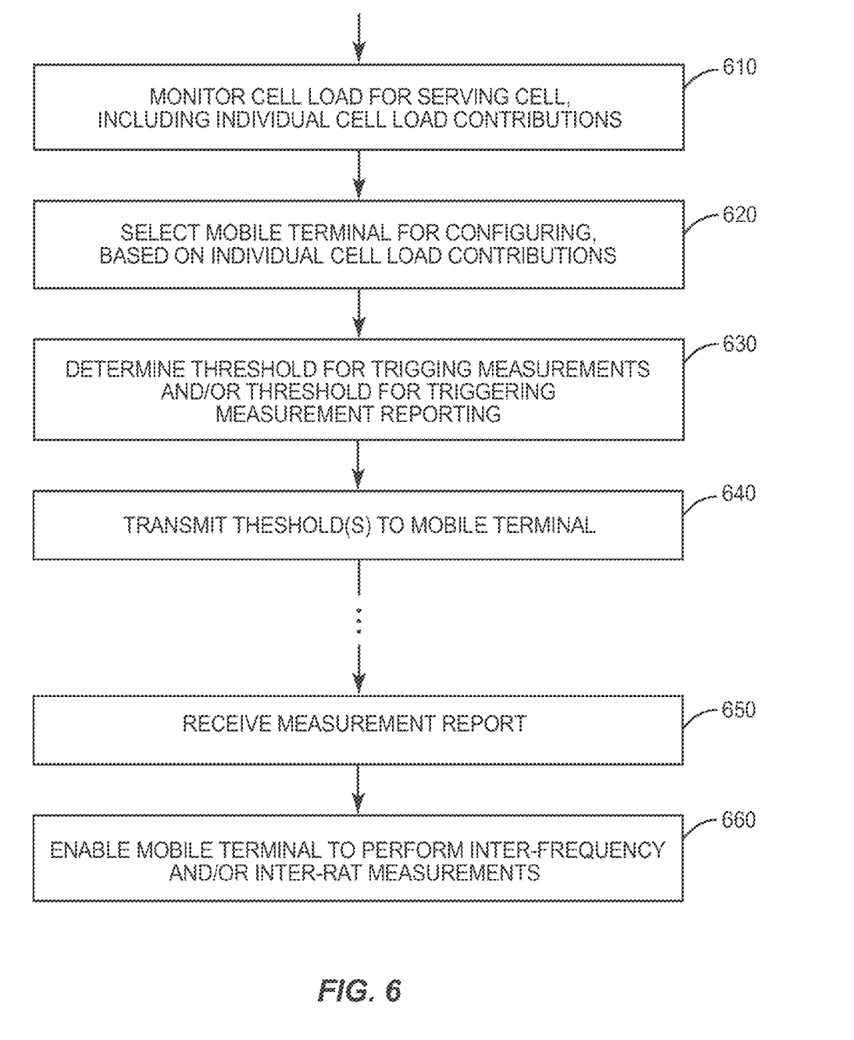

FIG. 6 illustrates another example method that utilizes several of the preceding techniques. As shown at block 610, the method again begins with monitoring a cell load for the serving cell. In this case, individual cell load contributions for several UEs are monitored. (Note that a total cell load may also be monitored.) As shown at block 620, a first mobile terminal to be configured with new thresholds is selected, based on its individual cell load contribution. Of course, more than one mobile terminal to be configured may be selected. This selection may involve identifying the UE or UEs having the highest contribution to the total cell load, for example, or those UEs responsible for more than a predetermined percentage of the cell load, etc.

As shown at block 630, the illustrated method continues with the determination of a signal threshold to be used for triggering neighbor cell measurements, or a signal threshold to be used for triggering measurement reporting, or both. As shown at block 640, the base station then transmits the threshold (or thresholds) to the selected UE (or UEs). These thresholds are based on the monitored cell load for the serving cell, e.g., the total cell load, an individual load contribution for a given mobile terminal, or both. Note that either of these thresholds may correspond to a RSRP or a RSRQ, for example. A threshold for triggering neighbor cell measurements might correspond to RSRP for the serving cell in an LTE network, for example, in which case the adapted threshold is an s-Measure.

In some cases, a base station may initially configure the UE to perform only intra-frequency measurements, for example, and then, after receiving measurement reports electively enable the UE to perform other types of measurements. This approach is illustrated more generally in blocks 650 and 660 of FIG. 6. At block 650, the base station receives a measurement report, triggered by a comparison, at the mobile terminal, of a measurement to the measurement reporting threshold. For example, the measurement reporting threshold may be an Event A2 triggering threshold, which may correspond to an RSRP level for the serving cell. In this case, the UE sends a measurement report in the event that the RSRP for the serving cell falls below the threshold. As seen at block 660, the base station may respond to the measurement report by enabling the mobile terminal to perform inter-frequency measurements or inter-RAT measurements, or both.

In some embodiments of the invention, the eNB is configured to scale the Event A2 triggering threshold of its UEs up and down, depending on the load that its cell is experiencing, before sending the scaled Event A2 triggering threshold. When the eNB receives a measurement report triggered by Event A2 (e.g., as shown at block 640 of FIG. 6) it enables inter-frequency and inter-RAT measurements for the concerned UE (as shown at block 650 of FIG. 6). The eNB can select all the UEs for this, or randomly a certain percentage of the UEs, e.g., depending on the load. One advantage of this approach is that the UEs will be configured for inter-frequency/inter-RAT measurement (and any measurement gaps that they may require) only when they are observing relatively poor radio conditions. On the other hand, initially configuring UEs for inter-frequency and/or inter-RAT measurements, without waiting for an Event A2 trigger, might lead to a slightly faster small cell discovery, since the UEs are already ready to perform measurements.

In some embodiments of the techniques described above, the eNB scales the s-Measure to be used for inter-frequency and/or inter-RAT measurements up or down, depending on the load contribution from a particular UE. UEs configured in this manner will be more likely to perform inter-frequency and inter-RAT measurements when they are overloading the cell, i.e., when offloading them could generate the most benefit. Note that this could be combined with techniques for adapting thresholds based on the total cell level load. For example, when an eNB notices that it is being overloaded, it can select a certain percentage of the top load contributors to the cell load. This can be based on UE scheduling history, UE traffic volume as indicated by buffer status reports, etc. The eNB can then scale up the s-Measure for these UEs, for example, so that they will be more likely to discover small cells.

In still other embodiments, the eNB scales the Event A2 triggering threshold up and down depending on the load contribution from a particular UE, and, when it receives a measurement report triggered by Event A2 from this UE, enables it for inter-frequency and inter-RAT measurements. Again, UEs configured in this manner will be more likely to perform inter-frequency and inter-RAT measurements when they are overloading the cell, i.e., when offloading them could generate the most benefit. Once again, this can be combined with threshold adaptations based on total cell load. For example, the eNB, when noticing that it is being overloaded, can select a certain percentage of the top load contributors to the cell load and scale up their Event A2 triggering threshold so that they will be more likely to send measurement reports that will lead to their being enabled for inter-frequency/inter-RAT measurements.

In still other embodiments, the eNB configures an adaptive inter-frequency/Inter-RAT scanning period that depends on the cell load or the load contribution of the UE, or both. The value of the scanning period determines how often the UE tries to measure inter-frequency/inter-RAT neighbors. For example, the UE can be sent a configuration containing a mapping of some s-Measure ranges and associated scanning periods, and when the RSRP meets the s-Measure criteria, it starts performing measurements on neighbor cell a certain number of times every scanning period. This is different from measurement period as defined in the specs, which specifies how long the UE has to gather measurements and average them and consider it as one measurement (in order to avoid the fast fluctuations in radio due to fading). For example, with a measurement period of 200 milliseconds, and pattern 0, UE can perform up to 5 measurements, and average them. In contrast, a scanning period of 200 milliseconds might be configured, e.g., to direct the UE to perform one measurement every 200 milliseconds. It will be appreciated that this approach may require modifications to the UE, unlike several of the other techniques presented herein.

As described above, s-Measure configuration requires enabling the measurements to begin with, and might lead to some performance loss on a per-UE basis. However, unless a particular UE is using more than 85% of all the resources in a cell (i.e., needing more than the 36 ms available within the 40 ms measuring period when pattern 0 is used), which is highly unlikely if there are several UEs in the cell, a smart scheduler can compensate for the possible performance loss arising from measurement gaps.

Although the described solutions may be implemented in any appropriate type of telecommunication system supporting any suitable communication standards and using any suitable components, particular embodiments of the described solutions may be implemented in an eNB in an LTE network, such as the base station 110 illustrated in FIG. 1. The example network may further include any additional elements suitable to support communication between wireless devices or between a wireless device and another communication device, such as a landline telephone or a node in a private data network.

Figure 7:
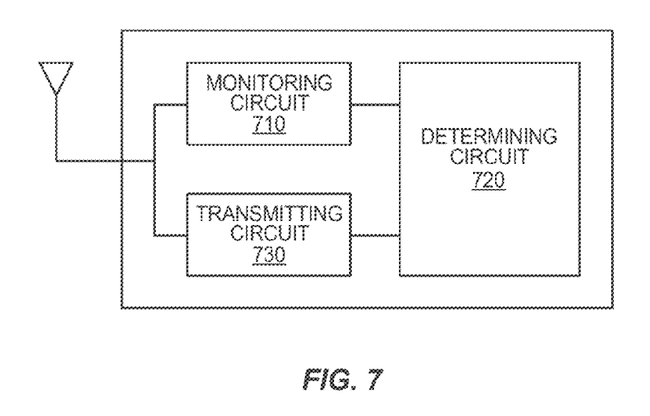
FIG. 7 is a block diagram illustrating functional components of an example base station.

A more detailed view of base station 110 is provided in FIG. 7. As seen in the figure, base station 110 includes a monitoring circuit 710 adapted to monitor a cell load for the serving cell, a determining circuit 720 adapted to determine a first signal threshold for the serving cell to be used for triggering neighbor cell measurements by at least a first mobile terminal, or a second signal threshold for the serving cell to be used for triggering reporting of neighbor cell measurements by the first mobile terminal, or both, depending on the monitored cell load. The base station 110 further includes a transmitting circuit 730, which is adapted to transmit the determined first signal threshold or the determined second signal threshold, or both, to the first mobile terminal. Note that base station 110 may be adapted to carry out any of the various techniques described above in connection with FIGS. 5 and 6, and may be adapted to carry out various combinations of these techniques.

Figure 8:
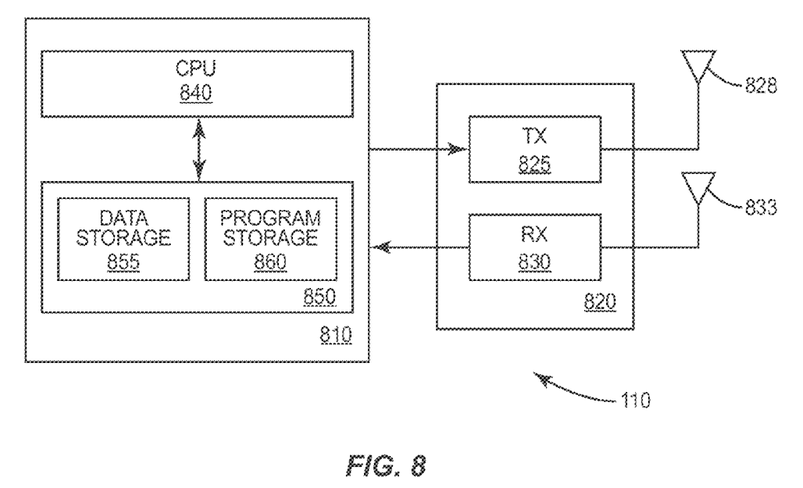
FIG. 8 is a schematic block diagram illustrating components of an example base station.

While FIG. 7 provides a functional view of base station 110, it will be appreciated that these functions may be implemented using radio circuitry and electronic data processing circuitry provided in a base station, and in some cases may be implemented by modifying existing radio circuit and data processing circuit designs. FIG. 8 provides another view of base station 110, focusing on the segregation of system functionality between radio circuits and processing circuits. Again, the illustrated base station 110 may be adapted, for example, to carry out the operations illustrated in the process flow diagrams of FIGS. 5 and 6, and any of the variations described above.

Base station 110 as illustrated in FIG. 8 comprises a transceiver 820 for communicating with mobile terminals (in the case of a base station) or with one or more base stations (in the case of a mobile terminal) as well as a processing circuit 810 for processing the signals transmitted and received by the transceiver 820. Transceiver 820 includes a transmitter 825 coupled to one or more transmit antennas 828 and receiver 830 coupled to one or more receive antennas 833. The same antenna(s) 828 and 833 may be used for both transmission and reception. Receiver 830 and transmitter 825 use known radio processing and signal processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the invention, additional details are not shown here.

Processing circuit 810 comprises one or more processors 840 coupled to one or more memory devices 850 that make up a data storage memory 855 and a program storage memory 860. Processor 840, identified as CPU 840 in FIG. 8, may be a microprocessor, microcontroller, or digital signal processor, in some embodiments. More generally, processing circuit 810 may comprise a processor/firmware combination, or specialized digital hardware, or a combination thereof. Memory 850 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices and wireless base stations are well known and are unnecessary to a full understanding of the invention, additional details are not shown here.

Typical functions of the processing circuit 810 include modulation and coding of transmitted signals and the demodulation and decoding of received signals. In several embodiments of the present invention, processing circuit 810 is adapted, using suitable program code stored in program storage memory 860, for example, to carry out one of the techniques described above for adapting neighbor cell measurements performed by mobile terminals served by the base station 110, using transceiver 820 to transmit and receive signals from one or more served UEs. Of course, it will be appreciated that not all of the steps of these techniques are necessarily performed in a single microprocessor or even in a single module.

The various methods and apparatus described above provide several advantages in a heterogeneous network. First, most of the techniques are transparent to the UE. As a result legacy UEs (i.e., those UEs already on the market) can benefit from the techniques. Second, the techniques can be used to ensure that UEs will trigger inter-frequency and/or inter-RAT measurements at the optimal time, e.g., when the system needs offloading and when they are the ones that give the most offloading benefit. Most of the techniques require no standardization changes and can be readily realized as proprietary features in network equipment, thus simplifying the deployment of the techniques and speeding up network performance improvements.

With these and other variations and extensions in mind, those skilled in the art will appreciate that the foregoing description and the accompanying drawings represent non-limiting examples of the methods and apparatus taught herein for adapting neighbor cell measurements in a wireless communication network. As such, the present invention is not limited by the foregoing description and accompanying drawings. Instead, the present invention is limited only by the following claims and their legal equivalents.

What is claimed is:

1. A method in a base station for adapting neighbor cell measurements performed by mobile terminals served by a serving cell supported by the base station, the method comprising:
   monitoring a cell load for the serving cell;
   determining individual cell load contributions for each of a group of two or more mobile terminals served by the serving cell;
   selecting a first mobile terminal from the group of two or more mobile terminals, based on the individual cell load contributions;
   determining a first signal threshold for the serving cell to be used for triggering neighbor cell measurements by the selected first mobile terminal, or a second signal threshold for the serving cell to be used for triggering reporting of neighbor cell measurements by the selected first mobile terminal, or both, wherein said determined first signal threshold, or said determined second threshold, or both are based on the monitored cell load; and transmitting the determined first signal threshold or the determined second signal threshold, or both, to the selected first mobile terminal.

2. The method of claim 1, wherein said cell load is a total cell load for the serving cell.

3. The method of claim 1, wherein said determining of the first signal threshold or second signal threshold, or both, is based on the individual cell load contribution for the selected first mobile terminal.

4. The method of claim 1, wherein said determining of the second signal threshold is based on the individual cell load contribution for the selected first mobile terminal, the method further comprising:
receiving, from the selected first mobile terminal, a measurement report triggered by a comparison of a measurement to the second signal threshold; and
enabling the selected first mobile terminal to perform inter-frequency measurements or inter-radio-access-technology measurements, or both, in response to receiving said measurement report.

5. The method of claim 1, wherein said first signal threshold is a threshold for triggering inter-frequency and inter-radio-access-technology measurements.

6. The method of claim 1, wherein at least one of the first signal threshold and the second signal threshold corresponds to Reference Signal Received Power (RSRP) measurements.

7. The method of claim 1, wherein at least one of the first signal threshold and the second signal threshold corresponds to Reference Signal Received Quality (RSRQ) measurements.

8. The method of claim 1, wherein said first signal threshold is a reference signal received power threshold value, representing a received power below which the selected first mobile terminal should initiate at least one of intra-frequency, inter-frequency, and inter-RAT neighbor cell measurements.

9. The method of claim 1, wherein said second signal threshold is a reference signal received power threshold value, representing a received power below which the selected first mobile terminal should begin measurement reporting for at least one of intra-frequency, inter-frequency, and inter-RAT neighbor cells.

10. A base station configured to adapt handover measurements performed by mobile terminals served by a serving cell supported by the base station, the base station comprising:
a monitoring circuit adapted to monitor a cell load for the serving cell;
a determining circuit adapted to
determine individual cell load contributions for each of a group of two or more mobile terminals served by the serving cell,
select a first mobile terminal from the group of two or more mobile terminals, based on the individual cell load contributions, and
determine a first signal threshold for the serving cell to be used for triggering neighbor cell measurements by the selected first mobile terminal, or a second signal threshold for the serving cell to be used for triggering reporting of neighbor cell measurements by the selected first mobile terminal, or both, wherein said determined first signal threshold, or said determined second threshold, or both are based on the cell load; and
a transmitting circuit adapted to transmit the determined first signal threshold or the determined second signal threshold, or both, to the selected first mobile terminal.

11. The base station of claim 10, wherein said cell load is a total cell load for the serving cell.

12. The base station of claim 10, wherein the determining circuit is configured to determine the first signal threshold or second signal threshold, or both, based on the individual cell load contribution for the selected first mobile terminal.

13. The base station of claim 10, wherein the determining circuit is configured to determine the second signal threshold based on the individual cell load contribution for the selected first mobile terminal and is further configured to:
receive, from the selected first mobile terminal, a measurement report triggered by a comparison of a measurement to the second signal threshold; and
enable the selected first mobile terminal to perform inter-frequency measurements or inter-radio-access-technology measurements, or both, in response to receiving said measurement report.

14. The base station of claim 10, wherein said first signal threshold is a threshold for triggering inter-frequency and inter-radio-access-technology measurements.

15. The base station of claim 10, wherein at least one of the first signal threshold and the second signal threshold corresponds to Reference Signal Received Power (RSRP) measurements.

16. The base station of claim 10, wherein at least one of the first signal threshold and the second signal threshold corresponds to Reference Signal Received Quality (RSRQ) measurements.

17. The base station of claim 10, wherein said first signal threshold is a reference signal received power threshold value, representing a received power below which the selected first mobile terminal should initiate at least one of intra-frequency, inter-frequency, and inter-RAT neighbor cell measurements.

18. The base station of claim 10, wherein said second signal threshold is a reference signal received power threshold value, representing a received power below which the selected first mobile terminal should begin measurement reporting for at least one of intra-frequency, inter-frequency, and inter-RAT neighbor cells.

19. A base station configured to adapt handover measurements performed by mobile terminals served by a serving cell supported by the base station, the base station comprising:
a transceiver circuit; and
a processing circuit configured to monitor a cell load for the serving cell, determine individual cell load contributions for each of a group of two or more mobile terminals served by the serving cell, select a first mobile terminal from the group of two or more mobile terminals, based on the individual cell load contributions, determine a first signal threshold for the serving cell to be used for triggering neighbor cell measurements by the selected first mobile terminal, or a second signal threshold for the serving cell to be used for triggering reporting of neighbor cell measurements by the selected first mobile terminal, or both, wherein said determined first signal threshold, or said determined second threshold, or both are based on the cell load;
wherein said processing circuit is further configured to transmit the determined first signal threshold or the determined second signal threshold, or both, to the selected first mobile terminal, using the transceiver circuit.

20. A method in a base station for adapting neighbor cell measurements performed by mobile terminals served by a serving cell supported by the base station, the method comprising:

monitoring a cell load for the serving cell;
determining a first signal threshold for the serving cell to be used for triggering neighbor cell measurements by at least a first mobile terminal, or a second signal threshold for the serving cell to be used for triggering reporting of neighbor cell measurements by the first mobile terminal, or both, wherein said determined first signal threshold, or said determined second threshold, or both are based on the monitored cell load; and
transmitting the determined first signal threshold or the determined second signal threshold, or both, to the first mobile terminal.

21. A base station configured to adapt handover measurements performed by mobile terminals served by a serving cell supported by the base station, the base station comprising:
a monitoring circuit adapted to monitor a cell load for the serving cell;
a determining circuit adapted to determine a first signal threshold for the serving cell to be used for triggering neighbor cell measurements by at least a first mobile terminal, or a second signal threshold for the serving cell to be used for triggering reporting of neighbor cell measurements by the first mobile terminal, or both, wherein said determined first signal threshold, or said determined second threshold, or both are based on the monitored cell load; and
a transmitting circuit adapted to transmit the determined first signal threshold or the determined second signal threshold, or both, to the first mobile terminal.

* * * * *